(12) United States Patent
Kang et al.

(10) Patent No.: US 7,555,207 B2
(45) Date of Patent: Jun. 30, 2009

(54) STORAGE MEDIUM STORING TEXT-BASED SUBTITLE DATA INCLUDING STYLE INFORMATION, AND APPARATUS AND METHOD OF PLAYING BACK THE STORAGE MEDIUM

(75) Inventors: Man-seok Kang, Suwon-si (KR);
Kil-soo Jung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 10/981,748

(22) Filed: Nov. 5, 2004

(65) Prior Publication Data
US 2005/0117886 A1    Jun. 2, 2005

(30) Foreign Application Priority Data
Nov. 10, 2003    (KR)    ............ 10-2003-0079244

(51) Int. Cl.
*H04N 5/00*    (2006.01)
(52) U.S. Cl. .................. 386/126; 386/46; 386/83
(58) Field of Classification Search .......... 386/95, 386/125, 126, 46, 83; 725/44–47, 51, 52, 725/112, 113; 345/619, 723, 731, 738, 762–764; 348/564; 715/513, 730–732, 760–765, 769, 715/810, 835, 838; 707/517, 523
See application file for complete search history.

(56) References Cited

U.S. PATENT DOCUMENTS

| | | | |
|---|---|---|---|
| 5,731,847 A * | 3/1998 | Tsukagoshi | ........... 348/589 |
| 6,115,529 A | 9/2000 | Park | |
| 6,345,147 B1 | 2/2002 | Mimura et al. | |
| 6,480,669 B1 | 11/2002 | Tsumagari et al. | |
| 6,496,981 B1 * | 12/2002 | Wistendahl et al. | ........ 725/112 |
| 6,964,025 B2 * | 11/2005 | Angiulo et al. | ........... 715/838 |
| 2002/0161802 A1 * | 10/2002 | Gabrick et al. | ........... 707/517 |
| 2003/0021586 A1 * | 1/2003 | Suh | ............ 386/95 |
| 2003/0189669 A1 * | 10/2003 | Bowser | ........ 348/564 |

(Continued)

FOREIGN PATENT DOCUMENTS

CN    1177172 A    3/1998

(Continued)

OTHER PUBLICATIONS

Office Action issued on Dec. 13, 2006 by the Korean Intellectual Property Office for Korean Patent Application No. 2003-79244.

(Continued)

*Primary Examiner*—Thai Tran
*Assistant Examiner*—Mishawn Dunn
(74) *Attorney, Agent, or Firm*—Stein McEwen, LLP

(57) ABSTRACT

A storage medium includes text-based subtitle data including style information for use with an apparatus and a method of playing back the storage medium. The storage medium includes moving image data, and subtitle data for providing a subtitle for the moving image data. The subtitle data is recorded based on a text to be separated from the moving image data and includes information used to select or change an output style of the subtitle. Accordingly, the subtitle can be output using style information selected by a user, and a style in which a subtitle is output can be changed.

13 Claims, 10 Drawing Sheets

U.S. PATENT DOCUMENTS

2004/0081434 A1* 4/2004 Jung et al. .................. 386/95

FOREIGN PATENT DOCUMENTS

| CN | 1205794 A | 1/1999 |
|---|---|---|
| EP | 0791925 A2 | 8/1997 |
| JP | 2000-322875 | 11/2000 |
| JP | 2001-135066 | 5/2001 |
| KR | 10-242345 | 11/1999 |
| KR | 2001-64234 A | 7/2001 |
| KR | 2003-25964 | 3/2003 |
| KR | 2003-25964 A | 3/2003 |
| KR | 20-315952 | 5/2003 |
| KR | 20-0315952 | 5/2003 |
| KR | 2004-51446 | 6/2004 |
| KR | 2004-79690 | 9/2004 |
| WO | WO 92/00647 | 1/1992 |
| WO | WO 2004/036574 | 4/2004 |
| WO | WO 2005/034122 | 4/2005 |

OTHER PUBLICATIONS

Office Action issued May 28, 2007 by the Korean Intellectual Property Office re: Korean Application No. 2003-79244 (7 pp).

Office Action issued by Chinese Patent Office in Chinese Patent Application No. 2004800302010 on May 9, 2008.

Microsoft Corporation. "Understanding SAMI 1.0". Feb. 2003.

Anonymous. "divxsubtitles.net". Aug. 3, 2003.

Blu-ray Disc Founders. "White paper Blu-ray Disc Format, 2.A Logical and Audio Visual Application Formation Specifications for BD-RE". Aug. 2004.

European Search Report dated Nov. 20, 2008 of the European Patent Application No. 04818265.3.

* cited by examiner

FIG. 2

| Elements | Minimal Content Model | Attributes |
|---|---|---|
| subtitle | styleset, script | subtitle_id(ID), lang(LanguageCode), title(CDATA) |
| styleset | stylesheet+ | |
| stylesheet | style+ | stylesheet_id(ID), default("yes" \| "no"), desc(CDATA) |
| style | EMPTY | style_id(Class), font(Charset), color(Color), bgcolor(Color), size(Number), position(Number, Number), align("left" \| "right" \| "center"), region(Coords), lineheight(Number) |
| script | dialog+ | |
| dialog | PCDATA | begin(PresentationTime), end(PresentationTime), ref_style_id(IDREF) |

201 — subtitle
202 — styleset, stylesheet, style
203 — script, dialog

FIG. 3

```
<subtitle>
<styleset>
  <stylesheet stylesheet_id="0" default="yes" desc="normal size font">
    <style style_id="x" font="gothic.ttf" color="black" bgcolor="white" size="60pt"
      position="x4,y4" align="center" region="l4,t4,w4,h4" lineheight="70px" />
    <style style_id="y" font="arial.ttf" color="yellow" bgcolor="black" size="30pt"
      position="x5,y5" align="center" region="l5,t5,w5,h5" lineheight="35px" />
  </stylesheet>
  <stylesheet stylesheet_id="1" default="no" desc="large size font">
    <style style_id="x" font="gothic.ttf" color="black" bgcolor="white" size="70pt"
      position="x7,y7" align="center" region="l7,t7,w7,h7" lineheight="80px" />
    <style style_id="y" font="arial.ttf" color="yellow" bgcolor="black" size="40pt"
      position="x8,y8" align="center" region="l8,t8,w8,h8" lineheight="45px" />
  </stylesheet>
</styleset>
<script>
  <dialog begin="00:01:00" end="00:05:00" ref_style_id="x"> Hello. </dialog>
</script>
</subtitle>
```

FIG. 5

Player Status Registers (PSRs)

| Reg. Num | Name | Meaning |
|---|---|---|
| 0 | - | Reserved |
| 1 | Audio | Audio Stream Number |
| 2 | Subtitle | Subtitle Stream Number or Text Subtitle id |
| ... | | |
| 17 | Subtitle Language | Language Code for Subtitle |
| ... | | |
| 19 | Subtitle Stylesheet | Stylesheet_id forText Subtitle |
| 20 | - | Reserved |
| : | : | : |
| 63 | - | Reserved |

FIG. 6

GENERAL PURPOSE REGISTERS (GPRs) OR BUFFER OF TEXT SUBTITLE PROCESSOR

| Address | Value | Variable name |
|---|---|---|
| 0 | | |
| : | | |
| 100 | 102 | Start_addr_of_Stylesheet_ID |
| 101 | 2 | Num_of_Stylesheet |
| 102 | ID for Stylesheet "Normal" | Stylesheet[0] |
| 103 | ID for Stylesheet "Large" | Stylesheet[1] |
| : | | |
| 4098 | | |

FIG. 7

```
/* Next_Style and Prev_Style are pre-defined symbols */

Subtitle_Stylesheet_Change(arg)
{
    if(arg == Next_Style) — CASE A
    {
        if(PSR(19) == ValueOf(Start_addr_of_Stylesheet_ID + Num_of_Stylesheet - 1))
            PSR(19) = ValueOf(Start_addr_of_Stylesheet_ID);                              ---- 701
        else
        {
            addr = Start_addr_of_Stylesheet_ID;
            while(PSR(19) != ValueOf(addr))
                addr = addr + 1;                                                          ---- 702
            PSR(19) = ValueOf(addr + 1);
        }
    }
    else if(arg == Prev_Style) — CASE B
    {
        if(PSR(19) == ValueOf(Start_addr_of_Stylesheet_ID))
            PSR(19) = ValueOf(Start_address_of_Stylesheet_ID + Num_of_Stylesheet - 1);   ---- 703
        else
        {
            addr = Start_addr_of_Stylesheet_ID;
            while(PSR(19) != ValueOf(addr))
                addr = addr + 1;                                                          ---- 704
            PSR(19) = ValueOf(addr - 1);
        }
    }
    else — CASE C
    {
        PSR(19) = arg;                                                                    ---- 705
    }
}
```

FIG. 8

```
package BDROM.media.subtitle public interface TextSubtitle extends Subtitle {
    public boolean status;
    public TextSubtitleAttribute getAttribute();
    public unsigned int getLangCode();
    public String getTitleName();
    public unsigned int getSubtitleID();

public unsigned int getCurrentTextStylesheetID();
    public void setTextStylesheetID(unsigned int ID);
    public void nextTextStylesheet();
    public void prevTextStylesheet();
    public unsigned int getDefaultTextStylesheetID();

public Time getCurrentPresentationTime();
    public void setPresentationTime(Time t);

public FILE getCurrentTextSubtitle();
    public void setTextSubtitle(String filename or unsigned int ID);

public void start();
    public void stop();
}
```

801 brackets: setTextStylesheetID, nextTextStylesheet, prevTextStylesheet, getDefaultTextStylesheetID

FIG. 9

```
1 :   import BDROM.media.*;

2 :   public class PlayXlet extends Xlet implements ControllerListener {
3 :       Player player;

4 :       public void init() {
5 :           setLayout(new BorderLayout());
6 :           String mediaFile = getParameter("FILE");

7 :           try {
8 :               URL mediaURL = new URL(getDocumentBase(), mediaFile);
9 :               player = Manager.createPlayer(mediaURL);
10:               player.addControllerListener(this);
11:               player.subtitle = new TextSubtitle();
12:               player.subtitle.setTextSubtitle("filename");
13:           }catch(Exception e) {
14:               System.out.println("Get Exception " + e);
15:           }
        }

16:       public void start() {
17:           player.start();
        }

18:       public synchronized void controllerUpdate(ControllerEvent e) {
19:           if( e instanceof SubtitleToggleEvent ) {
20:               if(player.subtitle.status == TRUE)
21:                   player.subtitle.stop();
22:               else {
23:                   player.subtitle.setPresentationTime(player.getMediaTime());
24:                   player.subtitle.start();
                }
            }
25:           if( e instanceof nextSubtitleStylesheetEvent) {
26:               player.subtitle.nextTextStylesheet();
            }
27:           if(e instanceof prevSubtitleStylesheetEvent) {
28:               player.subtitle.prevTextStylesheet();
            }
29:           if(e instanceof setSubtitleStylesheetEvent) {
30:               player.subtitle.setTextStylesheetID(e.value);
            }
        }
    }
```

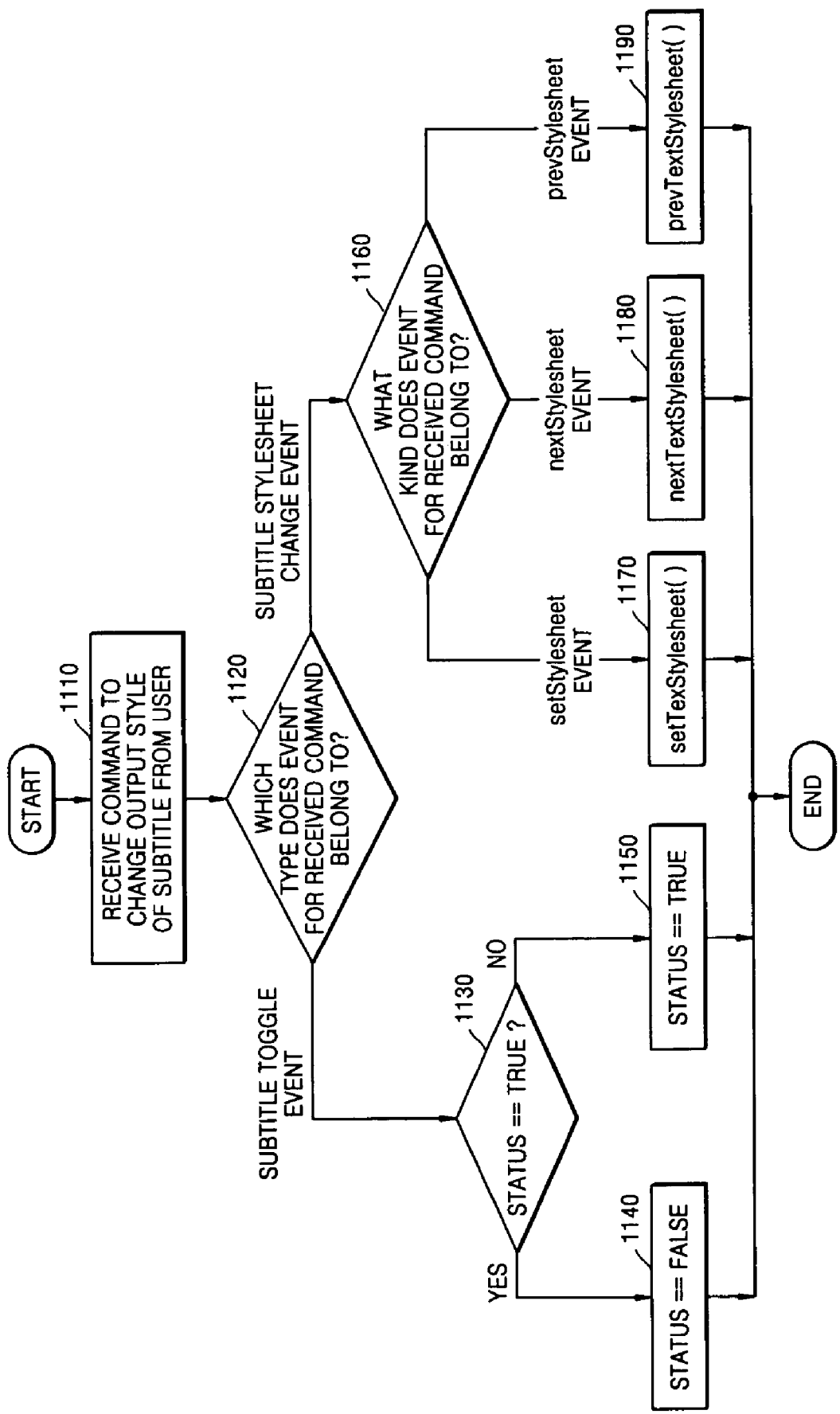

STORAGE MEDIUM STORING TEXT-BASED SUBTITLE DATA INCLUDING STYLE INFORMATION, AND APPARATUS AND METHOD OF PLAYING BACK THE STORAGE MEDIUM

CROSS-REFERENCE TO RELATED APPLICATION

This application claims the benefit of Korean Patent Application No. 2003-79244, filed on Nov. 10, 2003 in the Korean Intellectual Property Office, the disclosure of which is incorporated herein in its entirety by reference.

BACKGROUND OF THE INVENTION

1. Field of the Invention

The present invention relates to playback of a storage medium, and more particularly, to a storage medium in which text-based subtitle data including style information is recorded, and an apparatus and a method of playing back the storage medium.

2. Description of the Related Art

Generally, storage media, such as, digital versatile displays (DVDs), store audio-visual (AV) data, which includes video data and audio data. The stored video data and audio data in the AV data are compressed according to a standard such as the motion picture experts group (MPEG) standards. The AV data optionally includes subtitle data. Hereinafter, AV data is referred to as moving image data.

Conventional storage media, such as, DVDs, use bitmap-based sub-picture data as subtitle data for providing a subtitle of a moving image. The sub-picture data has been compressed together with a video stream, an audio stream, and the like according to a standard, such as, MPEG2 or the like. When subtitle data is provided using conventional bitmap-based sub-picture data, the subtitle data is accurately synchronized with video stream data.

However, the use of bitmap-based sub-picture data causes the following problems. First, because a subtitle is provided using a bitmap-based image, an output style of a subtitle reflected upon the manufacture of an image corresponding to the subtitle cannot be changed. Second, because sub-title data is multiplexed with a video stream, an audio stream, and the like, it is difficult to add new sub-title data to the multiplexed sub-title data or correct existing sub-title data. Third, the number of subtitle data that can be added is restricted to prevent degradation of the quality of an image.

SUMMARY OF THE INVENTION

An aspect of the present invention provides a storage medium in which text-based subtitle data including style information is recorded, and an apparatus and a method of playing back the storage medium.

According to an aspect of the present invention, there is provided a storage medium including: moving image data; and subtitle data for providing a subtitle for the moving image data, where the subtitle data is recorded based on a text to be separated from the moving image data and includes information used to select or change an output style of the subtitle.

An aspect of the subtitle data includes script information indicating a text to be displayed as a subtitle for the moving image data; and style information indicating an output style of the subtitle.

An aspect of the style information is divided into at least one stylesheet which is a unit in which the style information can be changed by a user.

An aspect of the stylesheet includes information about an identifier for distinguishing stylesheets from one another.

An aspect of the stylesheet includes information for designating a stylesheet to be initially applied upon a reproduction of the moving image data.

An aspect of the subtitle data is recorded in the form of a Markup document expressed with elements and attributes.

An aspect of the subtitle data is recorded on a local storage separate from the storage medium.

An aspect of the storage medium is an optical disc which is detachable from a playback apparatus and from which data can be read using an optical device.

According to another aspect of the present invention, there is provided an apparatus playing back a storage medium comprising moving image data, and subtitle data for providing a subtitle for the moving image data. The subtitle data is recorded based on a text to be separated from the moving image data and includes information used to select or change an output style of the subtitle. The playback apparatus includes a text subtitle processor verifying and processing the subtitle data to output a subtitle of a selected style, and a system register storing information used to select or change a style in which the subtitle is output.

An aspect of the subtitle data includes script information indicating a text to be displayed as a subtitle for the moving image data, and style information indicating an output style of the subtitle.

An aspect of the text subtitle processor renders the script information to which the style information is applied.

An aspect of the style information is divided into at least one stylesheet, which is a unit in which the style information can be changed by a user, and each of the at least one stylesheet includes information about an identifier for distinguishing stylesheets from one another.

An aspect of the system register stores an identifier of the stylesheet that is applied to the script information currently being reproduced.

An aspect of the text subtitle processor renders a subtitle by applying the stylesheet to the script information with reference to an identifier of the stylesheet stored in the system register.

An aspect of the playback apparatus further includes a core data processor controlling reproduction of the moving image data; a full data processor providing an interaction with a user with respect to the moving image data; a moving image data processor decoding the moving image data and outputting a result of the decoding on a display screen; and a blender blending an image output by the full data processor and an image output by the moving image data processor and outputting a result of the blending on the display screen.

An aspect of the core data processor and/or the full data processor receives a subtitle output command from the user and transmit the subtitle output command to the text subtitle processor.

An aspect of the text subtitle processor reads out the subtitle data, verifies whether the read-out subtitle data is consistent with a predefined sentence structure, and renders the script information using the style information included in the subtitle data.

An aspect of the moving image data processor decodes the moving image data and the rendered script information, blends a result of the decoding, and outputs a result of the blending on the display screen.

An aspect of the core data processor and/or the full data processor receives a command to change an output style of a subtitle from the user and transmits the command to the text subtitle processor.

An aspect of the text subtitle processor changes the style information used in rendering the script information and stores the changed style information in a system register.

An aspect of the full data processor transmits the command to change the output style of the subtitle to the text subtitle processor via a predefined application program interface (API).

An aspect of the full data processor supports one of a JAVA environment and/or Markup language environment.

An aspect of the application program interface includes one of a command to designate an identifier of the stylesheet, a command which refers to a stylesheet prior to a current stylesheet in a sequence of stylesheets, a command which refers to a stylesheet next to the current stylesheet in a sequence of the stylesheets, or combinations thereof.

According to another aspect of the present invention, there is provided a method of playing back a storage medium, the storage medium including: moving image data; and subtitle data for providing a subtitle for the moving image data, where the subtitle data being recorded is based on a text to be separated from the moving image data and includes information used to select or change an output style of the subtitle, and the playback method includes operations of: designating style information to be initially applied, with reference to the subtitle data; and checking whether a current subtitle-output status is a status in which a subtitle is output and rendering and outputting script information included in the subtitle data by using the style information.

According to an aspect of the invention, the operation of checking the current subtitle-output status and rendering and outputting the script information includes sub-operations of: if a command to change an output style of a subtitle is received from a user, checking a type of an event for the received command; and if the event belongs to a subtitle toggle event type, determining whether the current subtitle-output status is the status in which the subtitle is output or a status in which the subtitle is not output, and not outputting a subtitle if the current subtitle-output status is the status in which the subtitle is output and outputting the subtitle if the current subtitle-output status is the status in which the subtitle is not output.

According to an aspect of the invention, if the event belongs to a subtitle stylesheet change event type, the operation of checking the current subtitle-output status and rendering and outputting the script information includes a sub-operation of checking a sort of the event and changing an output style of the subtitle according to the sort of the event.

According to an aspect of the invention, if the event is a setStylesheet event, style information is set to be a stylesheet selected by the user to be the style information, if the event is a nextStylesheet event, the style information is set to be a stylesheet next to a stylesheet currently being used in a sequence of the stylesheets, if the event is a prevStylesheet event, the style information is set to be a stylesheet prior to the stylesheet currently being used in a sequence of the stylesheets.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent and more readily appreciated by describing in detail exemplary embodiments thereof with reference to the accompanying drawings of which:

FIG. 2 is a table defining elements and attributes that are used in a Markup document as an example of text-based subtitle data shown in FIG. 1;

FIG. 3 illustrates an example of text-based subtitle data written in a Markup language defined in FIG. 2;

FIG. 5 illustrates some of player status registers (PSRs) which are system registers that register style information included in text-based subtitle data shown in FIG. 1;

FIG. 6 illustrates some of general purpose registers (GPRs) which are system registers that register the style information included in the text-based subtitle data shown in FIG. 1;

FIG. 7 illustrates an algorithm for selecting appropriate style information in response to a user command according to an aspect of the invention;

FIG. 8 illustrates an example of an application program interface (API) used to change style information shown in FIG. 1;

FIG. 9 illustrates an example of a Java application written using the API defined in FIG. 8;

FIG. 11 is a flowchart illustrating a method of changing an output style of a subtitle using style information included in the text-based sub-title data of FIG. 1.

DETAILED DESCRIPTION OF THE EMBODIMENTS

Figure 1:
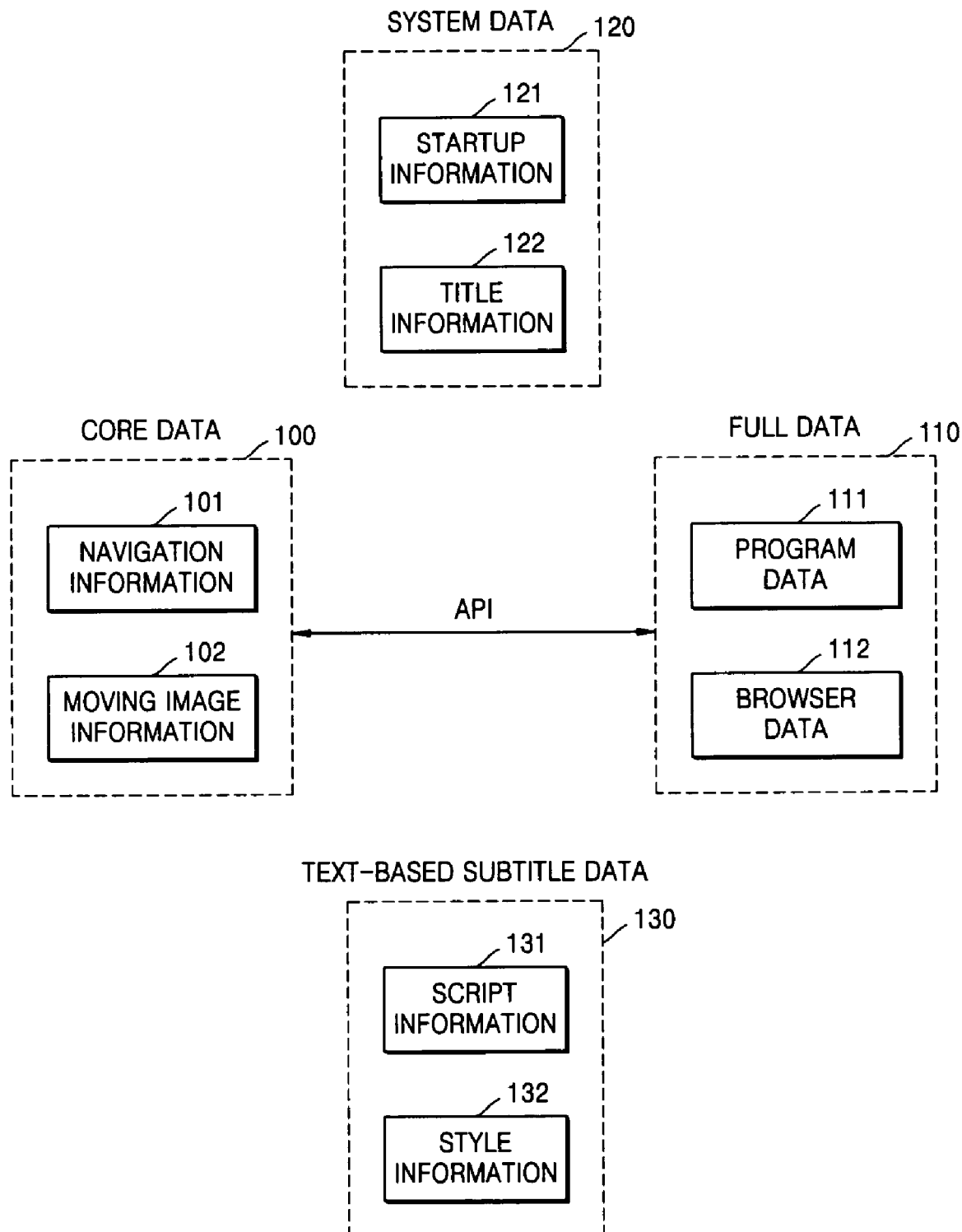
FIG. 1 is a block diagram showing types of data recorded in a storage medium according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram showing types of data recorded in a storage medium according to an embodiment of the present invention. Referring to FIG. 1, the storage medium includes core data 100, full data 110, system data 120, and text-based subtitle data 130.

The core data 100 is data for reproducing a moving image and includes moving image information 102, which has been compressed, and navigation information 101, which is used to control reproduction of the moving image information 102. The moving image information 102 includes one or more clip AN stream files encoded according to a standard, such as, MPEG. Each of the clips is a unit in which data is recorded. The moving image information 102 includes a clip information file including encoding attributes of the clip AN stream file, entry point information thereof, and the like. The moving image information 102 further includes a play list comprised of a plurality of play items, where the play item is a unit in which data is reproduced. Each of the play items indicates an in time location and an out time location over the clip information file. The moving image information 102 is reproduced with reference to the navigation information 101 of the storage medium, and a user watches a moving image, such as, a high-quality movie or the like reproduced from the moving image information 102. However, it is understood that the A/V data can be otherwise organized and that the data need not be compressed and/or can be compressed according to other standards.

The full data 110 is data for providing an extra function other than the reproduction of a moving image and includes program data 111, for providing an interaction with a user, and/or browser data 112, for reproducing information relating to the moving image from a Markup document. If the extra function is not necessary, the full data 110 may not be included.

According to aspects of the invention, the program data 111 is used to provide a game function using a moving image, a function of displaying a director's commentary while reproducing a part of a moving image, a function of displaying additional information while reproducing a part of a moving image, a function of executing chatting while reproducing a moving image, or the like. The program data 111 can support JAVA environments as well as other interactive environments.

The browser data 112 is a command to reproduce information relating to a moving image from a Markup document. The command can be expressed in a Markup language and/or an execution script language (e.g., the ECMA script language). The information relating to the moving image reproduced from the Markup document is played back together with the moving image. For example, recent news about movie actors stored in a web page, a file, or the like, news about opening of events relating to a movie, an updated subtitle of the movie, and the like can be reproduced from a storage medium storing the movie and played back together with the movie, and/or can be retrieved across a network or another storage medium to which the reproducing apparatus is connected. The full data 110 may further include another data for providing another function instead of the function of reproducing a moving image.

The system data 120 is data used to control reproduction of the core data 100 and/or the full data 110 and includes startup information 121 and title information 122. The startup information 121 indicates a location of an object to be first reproduced when the storage medium is played by a playback apparatus. The title information 122 includes entry point information indicating a location of each object to be reproduced.

The text-based subtitle data 130 is recorded separately from the core data 100, the full data 110, and the system data 120 and has a text-based data structure so that a style in which a manufactured subtitle is output can be changed, added, or corrected. For example, the text-based subtitle data 130 may be expressed in the text-based Markup language. The subtitle data 130 includes script information 131 and style information 132.

The script information 131 denotes a text to be displayed as a subtitle of a moving image. The style information 132 denotes information about a style in which the subtitle is output. The information is used while the script information 131 is being rendered to be displayed on a display device. The subtitle data 130 may be recorded in a local storage separate from the storage medium.

FIG. 2 is a table defining elements and attributes that are used in a Markup document for establishing an example of the text-based subtitle data 130 of FIG. 1. Referring to FIG. 2, the markup document includes script information 203 and style information 202 as described in a subtitle element 201. Hereinafter, a markup document for constructing subtitle data is referred to as a text subtitle document.

Elements and attributes used in a text subtitle document will now be described in detail. The subtitle element 201 denotes a top-level element in the text subtitle document. Every text subtitle document starts with the subtitle element. The subtitle element includes the following attributes: an attribute "subtitle_id" denoting a subtitle identifier (ID) for distinguishing each item of subtitle data from other items of subtitle data; an attribute "lang" denoting a character code of a language of a subtitle displayed on a screen using subtitle data; and an attribute title denoting a title of a moving image that uses the subtitle data.

A styleset element includes style information to be used in rendering subtitle data and includes at least one stylesheet element according to an aspect of the invention. The stylesheet element denotes a unit in which a style of the subtitle data is managed and changed. The stylesheet element includes at least one style element. If a plurality of stylesheet elements exist, each of the stylesheet elements includes an identical number of style elements, each of which is used to render subtitle data. If style elements are used for a manufacturer of a storage medium to render identical subtitle data although included in different stylesheet elements, the style elements have the same style_id value.

Each stylesheet element includes the following attributes. First, an attribute "stylesheet_id" denotes a stylesheet ID for distinguishing sytlesheet elements from each other. Since the attribute stylesheet_id is registered in a register of a playback apparatus, which will be described later, and used as a current style information value, the attribute stylesheet_id preferably has a binary value.

Second, an attribute "default" designates a stylesheet to be initially applied when subtitle data is output on a display screen. Only one stylesheet element has a default value "yes", and the remaining stylesheet elements have a default value "no".

Third, an attribute desc denotes descriptions of a style that is selected by the stylesheet element.

According to an aspect of the invention a style element stores style information to be used upon rendering of subtitle data and includes the following attributes. First, an attribute style_id denotes a style class value for distinguishing style elements included in a stylesheet element from one another. Second, an attribute font denotes a font to be used in a text used as script information by a dialog element. Third, an attribute color denotes a color of the text used as the script information by the dialog element. Fourth, an attribute bgcolor denotes a background color of the text used as the script information by the dialog element. Fifth, an attribute size denotes a size of each character of the text used as the script information by the dialog element. Sixth, an attribute position denotes a reference position at which characters of the text used as the script information by the dialog element are output. Seventh, an attribute align denotes an alignment of the text used as the script information by the dialog element. Eighth, an attribute region denotes a region over a screen on which the text is to be output using the dialog element. Ninth, an attribute lineheight denotes a line spacing of the text to be output on the screen using the dialog element.

A script element stores information about a subtitle text and includes at least one dialog element according to an aspect of the invention.

Each of the dialog elements stores information about a subtitle text to be displayed on the display screen and includes the following attributes. First, an attribute begin denotes information about a time when the subtitle text starts being displayed. Second, an attribute end denotes information about a time when the subtitle text ends being displayed. Third, an attribute ref_style_id denotes a class value of a specific style element for designating a style to be applied to the information about the subtitle text displayed on the display screen using the dialog element.

FIG. 3 illustrates an example of a file for the text-based subtitle data 130 written in a markup language defined in FIG. 2. Referring to FIG. 3, a text subtitle document starts with a subtitle element 300. The subtitle element 300 includes a single styleset element 310, including style information to be used in rendering script information, and a single script element 320, including script information of a moving image. The subtitle element 300 corresponds to the text-based subtitle data 1 30 of FIG. 1, the styleset element 310 corresponds to the style information 132 of FIG. 1, and the script element 320 corresponds to the script information 131 of FIG. 1.

The styleset element 310 includes first and second stylesheet elements 311 and 312. As described above, each of the stylesheet elements 311 and 312 denotes the unit in which a style can be managed and changed. Each of the stylesheet elements 311 and 312 includes the attribute stylesheet_id, which indicates an attribute value of the register of the playback apparatus, so as to reflect current style information.

The first stylesheet element 311 having an attribute stylesheet_id of 0 is set to have a default value "yes". Hence, as long as no style change commands by a user are generated, the first stylesheet element 311 is basically applied to the information about the subtitle text. The first stylesheet element 311 indicates a normal size font using the attribute desc.

The second stylesheet element 312 having an attribute stylesheet_id of 1 indicates a large size font using the attribute desc. Thus, when a style of a subtitle is changed by a user, a font size can be changed.

Each of the stylesheet elements 311 and 312 includes an identical number of style elements. Each of the style elements has, as its attribute value, style information actually applied to a subtitle text.

Style elements 311a, 311b, 312a, and 312b are used to indicate a plurality of pieces of style information that a manufacturer wants to apply to a subtitle text. As shown in FIG. 3, the first stylesheet element 311 includes the two style elements 311a and 311b, having attributes style_id of x and y, respectively. When the style element 311a having an attribute style_id of x is compared with the style element 311b having an attribute style_id of y, they have different style information. Particularly, the font size difference is large.

For example, a manufacturer can apply style information indicated by the style element 311a to a part of the subtitle text information, such as, a title of the subtitle, and style information indicated by the style element 311b to subtitle text information corresponding to a dialog.

While not required, it is preferable that the storage medium according to an embodiment of the present invention is an optical disc that is detachable from a playback apparatus and capable of reading out data using an optical device of the playback apparatus. Examples of the storage medium include, but are not limited to, CD-ROMs, DVDs, Bluray and Advanced Optical Discs, optical discs to be developed, and the like.

Figure 4:
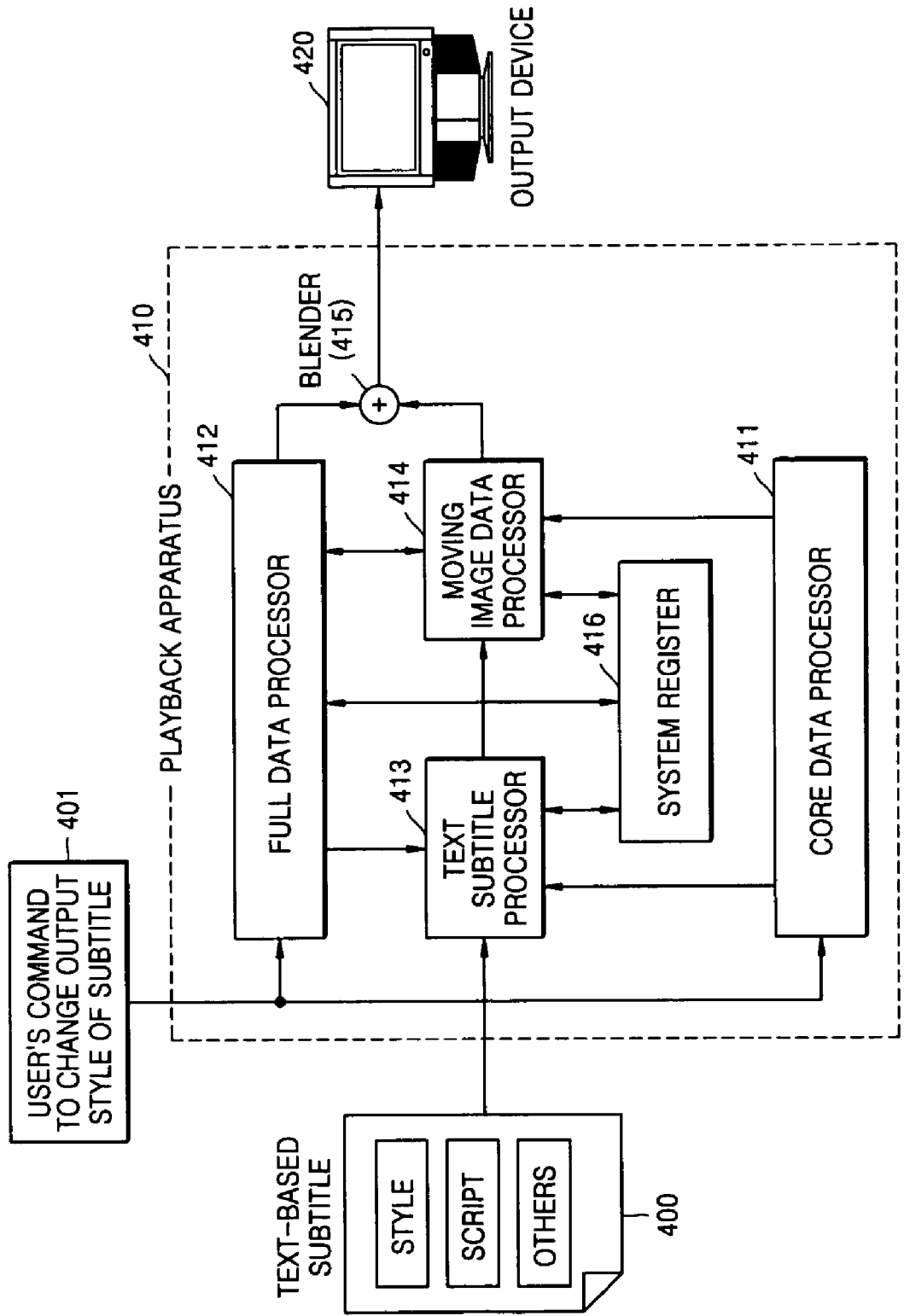
FIG. 4 is a conceptual block diagram of a playback apparatus supporting text-based subtitle data, according to an embodiment of the present invention.

A playback apparatus for playing back the aforementioned storage medium according to an embodiment of the present invention will now be described in detail with reference to FIGS. 1 and 4. FIG. 4 is a conceptual block diagram of a playback apparatus 410 supporting text-based subtitle data, according to an exemplary embodiment of the present invention. Referring to FIG. 4, the playback apparatus 410 includes a core data processor 411, a full data processor 412, a text subtitle processor 413, a moving image data processor 414, a blender 415, and a system register 416. While described in terms of a playback apparatus, it is understood that the apparatus can further have a recording capability and be a standalone device or incorporated into a general or special purpose computer.

The core data processor 411 controls reproduction of moving image data (i.e., the moving image information 102) using the navigation information 101 of FIG. 1. The core data processor 411 is also referred to as a navigation engine. The full data processor 412 processes application data providing an interaction with a user, such as, the program data 111 (e.g., a Java program or the like) and/or the browser data 112 (e.g., a markup document or the like). The full data processor 412 may include a program engine and a browser engine separated from the program engine, or the engines can be combined.

The text subtitle processor 413 verifies a construction of the text-based subtitle data 130, including the script information 131 and the style information 132, and processes the text-based subtitle data 130.

The moving image data processor 414 decodes the moving image data and outputs a result of the decoding on a screen of an output device 420. The moving image data processor 414 is also referred to as a presentation engine.

The blender 415 blends images output by the full data processor 412 and the moving image data processor 414 and outputs a result of the blending on the screen of the output device 420.

The system register 416 includes player status registers (PSRs), storing various types of status information about the playback apparatus, and general purpose registers (GPRs), which are used by the playback apparatus to temporarily record data.

Specifically, the core data processor 411 stores information necessary for playback in the system register 416 according to a navigation command for reproducing a moving image (such as, a movie), and transmits a reproduction command to the moving image data processor 414. In response to the reproduction command, the moving image data processor 414 decodes the moving image data using the information necessary for playback recorded in the system register 416. During reproduction of a moving image, when a subtitle output command is received by a user, the core data processor 411 transmits the subtitle output command to the text subtitle processor 413.

In response to the subtitle output command, the text subtitle processor 413 loads text subtitle data on a memory (not shown) and checks if a sentence structure of the text subtitle data matches with a predetermined sentence structure. If the sentence structure of the text subtitle data matches with the predetermined sentence structure, the text subtitle processor 413 parses script information and style information and renders the information about the subtitle text using the style information defined by the first stylesheet element 311 having the attribute value default=yes of FIG. 3. A result of the rendering is transferred to the moving image data processor 414 and output on the output device 420.

During the reproduction of the moving image, when receiving a user's command 401 to change an output style of the subtitle, the core data processor 411 transmits the user's command 401 to change the output style of the subtitle to the text subtitle processor 413. The text subtitle processor 413 changes the style information used upon the rendering of the information about the subtitle text (such as through changing a stylesheet to another stylesheet) and newly registers the changed style information in the system register 416.

When a movie is played back by the full data processor 412, the full data processor 412 records information necessary for reproducing an application included in the full data 110, in the system register 416 and controls the reproduction of the moving image using a pre-defined application program interface (API) for the moving image data processor 414. The moving image data processor 414 reproduces moving image data with reference to the information necessary for playback recorded in the system register 416 in the same manner as in a core mode (which denotes a moving image reproduction mode using core data and is referred to as a movie code).

During the reproduction of the moving image, when receiving the subtitle output command from the user, the full data processor 412 transmits the subtitle output command to the text subtitle processor 413. In response to the subtitle output command, the text subtitle processor 413 outputs a subtitle using the text-based subtitle data 130 in the same manner as in the core mode.

During the reproduction of the moving image, when receiving the user's command 401 to change the output style of the subtitle, the full data processor 412 transmits the user's command 401 to the text subtitle processor 413 via a pre-defined style changing API for the text subtitle processor 413. In response to the user's command 401, the text subtitle processor 413 changes the output style of the subtitle in the same manner as in the core mode.

FIG. 5 illustrates some of player status registers (PSRs) which are system registers that register the style information 132 included in the text-based subtitle data 130 of FIG. 1. Referring to FIG. 5, PSRs denote registers that record various types of status information about a playback apparatus according to the present invention. PSR No. 1 indicates the number of an audio stream selected to reproduce a current moving image, PSR No. 2 indicates the number of a subtitle stream selected to reproduce the current moving image, and PSR No. 17 indicates a language code of the subtitle stream selected to reproduce the current moving image.

PSR No. 19 is used to indicate a stylesheet ID selected in rendering the script information when a subtitle is output using text subtitle data. PSR No. 19 is just an embodiment, so may be replaced by any of 32-bit PSRs Nos. 1 through 63 of the shown embodiment, or can be any appropriate indicator in registers having other sizes.

PSR No. 19 can be changed by a user operation to be described later, a Java API, or the like. When a content of PSR No. 19 is changed during the reproduction of the moving image data including text-based subtitle data, a subtitle output style applied to the script information is also changed.

The above-described style information applied to current script information is stored in PSRs as shown in FIG. 5. Alternatively, the above-described style information may be stored in general purpose registers (GPRs) to be described later or in an internal buffer (not shown) of the text subtitle processor 413 according to aspects of the invention.

An example of a user operation (hereinafter, referred to as a UOP) for a style change will now be described. Function Text_subtitle_style_Change (stylesheet_id), which is a UOP, sets an ID of a stylesheet applied to the text subtitle data and changes the PSR No. 19. stylesheet_id, which is an argument of function Text_subtitle_style_Change (stylesheet_id), can have any of 0 to 231, because the number of styles applicable to a text subtitle is theoretically infinite, but a PSR according to the shown example has a 32-bit data size. An example of a new navigation command may be function SetSS(for stylesheet_id). The function SetSS(for stylesheet_id) changes a value of the PSR No. 19, indicating an ID of a stylesheet to be used in rendering the text subtitle data, to a designated argument value. Further, where a PSR has another storage size, it is understood that the stylesheet_id can have other numbers.

FIG. 6 illustrates some of GPRs which are system registers that register the style information 132 included in the text-based subtitle data 130 of FIG. 1. ID information about a stylesheet element defined in a styleset element is recorded in the GPRs as shown in FIG. 6. Alternatively, the ID information about the stylesheet element may be stored in the internal buffer of the text subtitle processor 413 or in the PSRs of FIG. 5.

Referring to FIG. 6, address No. 100 records 102 as a start address of ID information about a stylesheet element, and address No. 101 records 2 as the number of stylesheet elements used in a text subtitle document. Address 102 records an ID of a stylesheet element indicating a normal size of a font, and address 103 records an ID of a stylesheet element indicating a large size of a font. In other words, the text subtitle document described in FIG. 6 has two stylesheet elements that indicate a normal font size and a large font size, respectively.

A method in which the aforementioned playback apparatus reproduces moving image data using subtitle style information selected by a user from the aforementioned storage medium will now be described using FIG. 7. FIG. 7 illustrates an algorithm for selecting the style information 132 according to a user's command. When a command to change an output style of a subtitle is received from a user during reproduction of a moving image, the playback apparatus can change text subtitle data so that style information selected by the user can be applied using a function, such as function Subtitle_Stylesheet_Change (arg), which will be described later.

Referring to FIG. 7, argument Next_Style (case A) or Prev_Style (case B) may be used as the argument in the function Subtitle_Stylesheet_Change (arg). Alternatively, a specific attribute value stylesheet_ID may be indicated as the argument as in case C. The case C can be expressed in a function similar to the function for the aforementioned UOP.

In case A in which the Next_Style is used as the argument of the function Subtitle_Stylesheet_Change (arg), the playback apparatus increases a value of the stylesheet_ID stored in the PSR No. 19, the GPRs, or the internal buffer of the text-based subtitle processor 413, and applies a next style having the increased ID value. If the value of the stylesheet_ID of a currently used style is the greatest as in case 701, a style having the smallest stylesheet_ID value is used. In case 702, a style having a stylesheet_ID value obtained by increasing a current stylesheet_ID value 1 by 1 is used.

Cases 703 and 704 represent style changing methods applied in case B that Prev_Style is used as the argument of the function Subtitle_Stylesheet_Change (arg). Case 705 represents a method of storing a designated stylesheet_ID value in the PSR No. 19, the GPRs, or the internal buffer of the text-based subtitle processor 413.

FIG. 8 illustrates an example of an API used to change the style information 132 according to as aspect of the invention.

Referring to FIG. 8, a package BDROM can be used as a command group that can be used upon writing of an application included in the full data 110. The package BDROM includes a media package for controlling reproduction of a moving image according to an application.

The media package includes a subtitle package for controlling a text-based or a bitmap-based subtitle of a moving image. A TextSubitle interface is defined as a part of the subtitle package for the text-based subtitle. The TextSubtitle interface may include the following APIs. The term "status" denotes a parameter indicating an output on/off status of a subtitle. "getAttribute( )" obtains information about an attribute of a text subtitle file currently being used. "getLangCode( )" obtains a language code of the text subtitle file. "getTitleName( )" obtains a name of a title of moving image data. "getSubtitleID( )" obtains an ID of the current text subtitle file. "getCurrentTextStylesheet ID( )" obtains a stylesheet_ID currently being used. "setTextStylesheet ID (unsigned int ID)" receives as an argument an ID of a stylesheet to be used in rendering a subtitle text and sets the PSR No. 19 to be a stylesheet corresponding to the received ID argument. "nextTextStylesheet( )" denotes a stylesheet next to a current stylesheet in an array of stylesheets and sets a stylesheet to be used in rendering the subtitle text. "prevTextStylesheet( )" denotes a stylesheet previous to the current stylesheet in the array of stylesheets and sets the stylesheet to be used in rendering the subtitle text. "getDefaultTextStylesheet ID( )" obtains a stylesheet set as a default from the array of stylesheets. "getCurrentPresentationTime( )" obtains a presentation time indicating the time when a subtitle is output from current text-based subtitle data. "setPresentationTime (Time t)" sets a presentation time corresponding to a current reproduction time using time information t given as an argument. "getCurrentTextSubtitle( )" obtains an ID of the text subtitle file current currently being used for a current subtitle output. "setTextSubitle(String filename or unsigned int ID)" receives a file to be used in outputting a subtitle as an argument and sets the received file to be an ID of a received filename or a received text subtitle file. "start( )" starts outputting the text subtitle. "stop( )" stops outputting the text subtitle. However, it is understood that other API's can be used or developed, and that each API shown in FIG. 8 need not be used in all aspects of the invention.

FIG. 9 illustrates an example of a Java application written using the API defined in FIG. 8. Referring to FIG. 9, application PlayXlet inherits a function of application Xlet, which is a basic unit of the Java application and included in the full data 110 executed by the playback apparatus, and implements interface ControllerListener to process a command received from a user during reproduction of a moving image.

When an application implemented by extending an Xlet function starts, portion init( ) of the application is first executed to initialize the application. Then, portion start( ) of the application is executed. As shown in FIG. 9, when the application PlayXlet is executed, it is initialized by a first operation of the portion init( ) (refer to line 4). Codes of the application PlayXlet will now be described in detail.

In line 1, the media package described in FIG. 8 is imported to control moving image data. In line 2, an object of the application PlayXlet is declared. The application PlayXlet inherits the function of application Xlet and implements the interface ControllerListener. In line 3, an object Player, which is a moving image data controlling object used in the application PlayXlet, is declared. In lines 4 through 15, when the application PlayXlet is initially executed, it is initialized. In line 5, a layout of the application PlayXlet is set. In line 6, a file of the moving image data to be used by the application PlayXlet is named. In lines 7 through 13, an exception that may be generated while the object Player is being initialized is cached. In line 8, a path for moving-image data resources to be used by the application PlayXlet is designated. In line 9, a reproduction controlling object for the moving-image data resources corresponding to the designated path is produced and allocated to the object Player. In line 10, Event Listener used by the object Player to receive a command from a user and process the command is registered. In line 11, an object "subtitle" for the object Player is produced. In line 12, a text-based subtitle to be used by the object "subtitle" is designated. In lines 13 and 14, the exception that may be generated while the object Player is being initialized is processed. In line 14, an error message is output when the exception is generated. In lines 16 and 17, the portion start( ) is executed after the object Player is initialized. In line 17, reproduction of the moving image data controlled by the object Player starts. In lines 18 through 30, a control command received from the user is processed.

In lines 19 through 24, in an event type of SubtitleToggleEvent, when a current subtitle is being output, the subtitle output is stopped. On the other hand, when no subtitles are being output, a point in time when the subtitle is to be output is synchronized with a point in time when a current moving image is to be reproduced, and then the subtitle output starts.

In lines 25 and 26, in an event type of nextSubtitleStylesheetEvent, a stylesheet to be used in outputting a subtitle is changed to a stylesheet next to a stylesheet current being used. If the currently used stylesheet is the last one of an array of stylesheets, the stylesheet to be used in outputting the subtitle is changed to a first stylesheet of the array of stylesheets.

In lines 27 and 28, in an event type of prevSubtitleStylesheetEvent, the stylesheet to be used in outputting the subtitle is changed to a stylesheet previous to the stylesheet current being used. If the currently used stylesheet is the first one of the array of stylesheets, the stylesheet to be used in outputting the subtitle is changed to the last stylesheet of the array of stylesheets.

In lines 29 and 30, in an event type of setSubtitleStylesheetEvent, the stylesheet to be used in outputting the subtitle is changed to a stylesheet designated by an argument value included in an event object "e".

In an operation of the above-described Java application, when the application PlayXlet of FIG. 9 is executed, reproduction of designated moving image data starts. Once a subtitle output command is received from a user during reproduction of a moving image, an output of a subtitle starts. When another subtitle output command is received, the subtitle output is stopped.

When a command nextSubtitleStylesheetEvent is received from a user while the subtitle is being output, an output style of the subtitle is changed using style information having an attribute stylesheet_ID whose value is 1 greater than a value of an attribute stylesheet_ID of currently used style information. When a command prevSubtitleStylesheetEvent is received from the user while the subtitle is being output, the output style of the subtitle is changed using style information having an attribute stylesheet_ID whose value is 1 smaller than the value of the attribute stylesheet_ID of the currently used style information.

When a command setSubtitleStylesheet to set a current stylesheet to be a specific stylesheet is received using the application of FIG. 9, a subtitle output style changing menu provided by a playback, or the like, the current stylesheet is changed to the specific stylesheet using stylesheet_ID input by a user.

Figure 10:
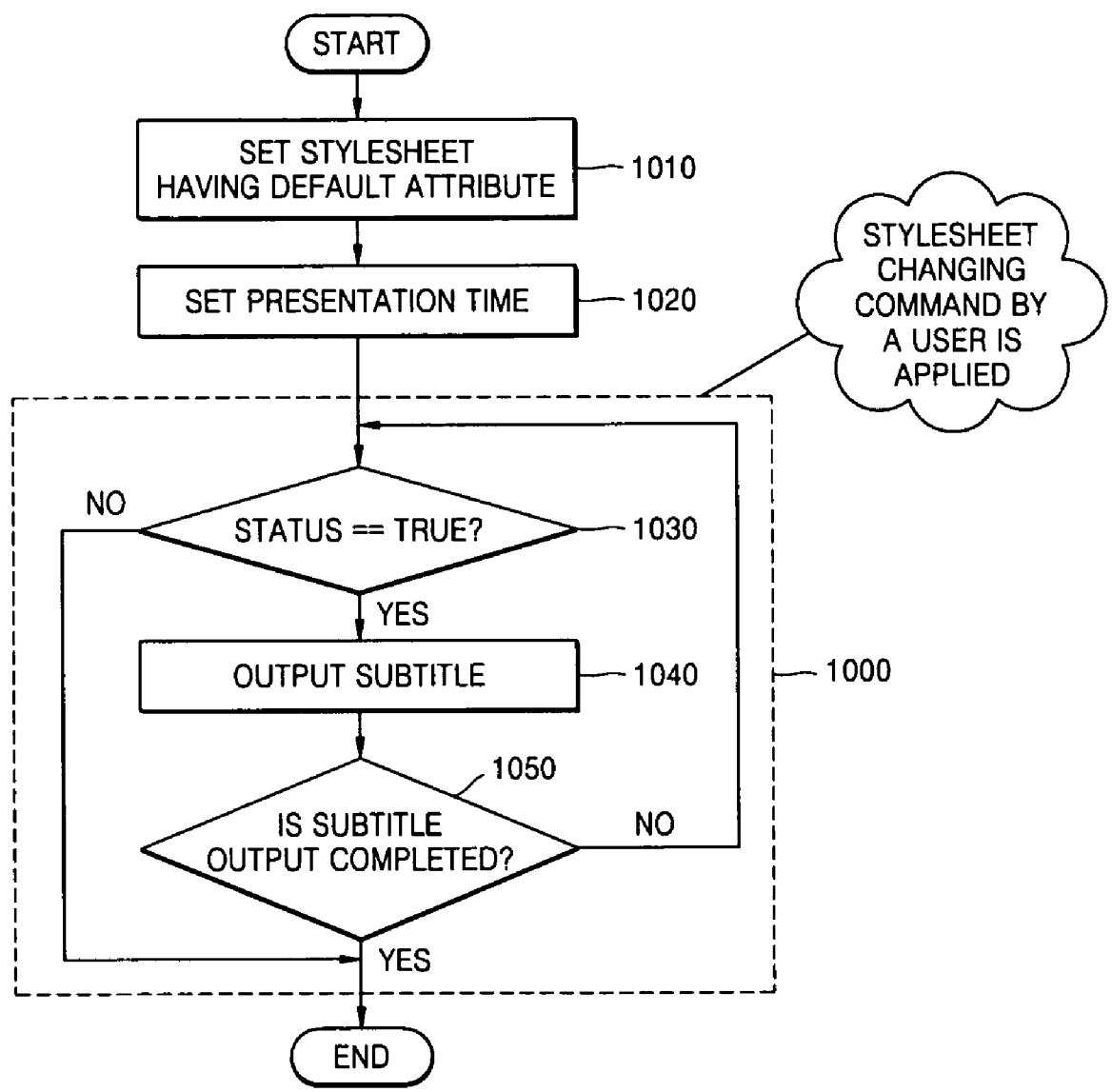
FIG. 10 is a flowchart illustrating a method of outputting a subtitle using text-based subtitle data shown in FIG. 1.

FIG. 10 is a flowchart illustrating a method of outputting a subtitle using the text-based subtitle data 130. Referring to FIG. 10, when a subtitle output start command is received from a user, a stylesheet element having a default attribute "yes" is set as style information to be used in rendering information about a subtitle text, in operation 1010. Thereafter, a point in time when a current moving image is reproduced is synchronized with a point in time when a subtitle is output by setting a presentation time, in operation 1020. It is checked whether a current subtitle-output status is a status in which a subtitle is output or a status in which the subtitle is not output, in operation 1030.

If the current subtitle output status is the status in which the subtitle is output, the subtitle output is performed, in operation 1040. If the current subtitle output status is the status in which the subtitle is not output, the subtitle output is concluded.

If the subtitle is output in operation 1040 and it is determined in operation 1050 that subtitle items to be continuously output remain, operations 1030 and 1040 are repeated. On the other hand, if it is determined in operation 1050 that no subtitle items to be continuously output remain, the subtitle output is concluded.

A stylesheet changing command by a user is applied to operations ranging from the operation 1030, in which an output status of the current subtitle is checked, to the operation 1050, in which it is checked whether the subtitle output is to be completed.

FIG. 11 is a flowchart illustrating a method of changing an output style of a subtitle using the style information 132 included in the text-based sub-title data 130 according to an aspect of the invention. Referring to FIG. 11, in operation 1110, a command to change an output style of a subtitle is received from a user. In operation 1120, it is determined whether an event for the received command is of a subtitle toggle event type or a subtitle stylesheet change event type.

If the event for the received command is of the subtitle toggle event type, it is determined whether a current subtitle-output status is a status in which a subtitle is output or a status in which a subtitle is not output, in operation 1130. If the current subtitle-output status is the status in which the subtitle is output, the subtitle status is changed to a status in which the subtitle is not output, in operation 1140. If the current subtitle-output status is the status in which the subtitle status is changed to the status in which the subtitle is not output, the subtitle is output, in operation 1150.

On the other hand, if the event for the received command is of the subtitle stylesheet change event type, it is determined whether the event for the received command is a setStylesheet event, a nextStylesheet event, or a prevStylesheet event, in operation 1160. The setStylesheet event designates a subtitle output style using an attribute stylesheet_id of a stylesheet selected by a user. The nextStylesheet event designates a subtitle output style using a stylesheet next to a stylesheet currently being used according to a sequence of stylesheets. The prevStylesheet event designates a subtitle output style using a stylesheet prior to the stylesheet currently being used according to the sequence of stylesheets. As described above with reference to FIG. 7, the setStylesheet event, the nextStylesheet event, and the prevStylesheet event are executed, in operations 1170, 1180, and 1190, respectively, so that a style of a subtitle displayed on a screen is changed according to the designated command.

A storage medium according to an embodiment of the present invention includes text-based subtitle data recorded separately from moving image data. The text-based subtitle data includes a plurality of pieces of style information so that a style in which a subtitle is output can be arbitrarily changed. Thus, a subtitle of a moving image can be output in various styles without degradation of the image quality of a video stream, and manufacture and edition of subtitle data are easy. Also, the style in which a subtitle is output can be arbitrarily changed by a user.

Additionally, while described in terms of a subtitle used with moving image data, it is understood that aspects of the present invention could be used with still image data and/or with audio data. Also, while described in terms of stylesheets, it is understood that aspects of the invention can be applied to any set of information associated with an electronic document and which sets forth a grouping of data, a definition of a document's appearance in terms of such elements as typeface, size, and color for headings and body text, how sections should be laid out in terms of space, line spacing, margin widths, spacing between headings, and so forth.

Further, in a storage medium according to an aspect of the present invention in which text-based subtitle data including style information is recorded and a device and method of playing back the storage medium, a subtitle can be output using style information selected by a user. Also, a style in which a subtitle is being output can be changed. In other words, text-based subtitle data according to a feature of the present invention can be easily formed and edited and output in various styles. In addition, various subtitle output styles can be selected by a user using a plurality of pieces of style information included in the text-based subtitle data.

While not required, aspects of the invention can also be embodied as computer readable codes on at least one computer readable recording media. The computer readable recording medium is any data storage device that can store data which can be thereafter read by a general or special purpose computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While a few embodiments of the present invention have been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A computer readable recording medium for use with a recording and/or reproducing apparatus, comprising:
   moving image data; and
   subtitle data used by the apparatus to provide a subtitle for the moving image data,
   wherein:
      the subtitle data comprises:
         a style set element comprising at least one style element and at least one user changeable style element, the at least one style element comprising an identifier of the style element and style information to be applied by the apparatus to a text in a script element, and the at least one user changeable style element comprising an identifier of the user changeable style element and style information which can be changed by a user's selection via the apparatus; and
      the script element comprising text information having the text to be used by the apparatus for the subtitle, information on an output time when the apparatus is to output subtitle, and information designating the identifier of the style element to be applied by the apparatus to the text, a user changeable style element whose identifier is identical with an identifier of a user changeable style element stored in a player register in the apparatus is used by the apparatus for providing the subtitle chosen from among the at least one user changeable style element.

2. The computer readable recording medium of claim 1, wherein the subtitle data is recorded in the form of a Markup document expressed with elements and attributes.

3. The computer readable recording medium of claim 1, wherein another portion of the subtitle data is recorded on a local storage medium separate from the recording medium having the moving image data.

4. The computer readable recording medium of claim 1, where the recording medium is detachable from a playback apparatus.

5. The computer readable recording medium of claim 4, whenever the recording medium comprise an optical disc from which data can be read using an optical device comprising the apparatus.

6. An apparatus which transfers data with respect to a storage medium, the storage medium comprising: moving image data; and subtitle data for providing a subtitle for the moving image data, wherein the subtitle data comprises a style set element comprising at least one style element and at least one user changeable style element, the at least one style element comprising an identifier of the style element and style information to be applied to a text in a script element, and the at least one user changeable style element comprising an identifier of the user changeable style element and style information which can be changed by a user's selection; and a script element comprising text information having the text to be used for the subtitle, information on an output time when the subtitle is to be output, and information designating the identifier of the style element to be applied to the text, the apparatus comprising:

a register that stores information used to select and/or change a style in which the subtitle is output; and a text subtitle processor which selects a style to be applied to the text using the identifier of the style element and the identifier of the user changeable style element stored in the register.

7. The apparatus of claim 6, further comprising:

a core data processor that controls reproduction of the moving image data read from the storage medium;

a full data processor providing an interaction with a user with respect to the reproduced moving image data;

a moving image data processor that decodes the moving image data and outputs a result of the decoding to be displayed on a display screen; and a blender that blends an image output by the full data processor and an image output by the moving image data processor and outputs a result of the blending to be displayed on the display screen.

8. The apparatus of claim 7, wherein:

one or both of the core data processor and the full data processor receives a subtitle output command from the user and transmits the subtitle output command to the text subtitle processor;

the text subtitle processor reads out the subtitle data, verifies whether the read-out subtitle data is consistent with a predefined sentence structure, and renders the script information using the style information included in the subtitle data; and the moving image data processor decodes the moving image data and the rendered script information, blends a result of the decoding, and outputs a result of the blending to be displayed on the display screen.

9. The apparatus of claim 8, wherein:

one or both of the core data processor and the full data processor receives a command to change an output style of the subtitle from the user and transmits the command to the text subtitle processor; and the text subtitle processor changes the user changeable style element used in rendering the script element and stores the changed user changeable style element in the register.

10. The apparatus of claim 9, wherein the full data processor transmits the command to change the output style of the subtitle to the text subtitle processor via a predefined application program interface (API).

11. The apparatus of claim 10, wherein the full data processor supports one of a JAVA environment and/or a Markup language environment.

12. The apparatus of claim 10, wherein the API includes a command to designate an identifier of a stylesheet, a command which refers to a stylesheet prior to a current stylesheet in a sequence of the stylesheets, a command which refers to a stylesheet next to the current stylesheet in a sequence of the stylesheets, or combinations thereof.

13. A method of playing back a storage medium, the storage medium comprising: moving image data; and subtitle data for providing a subtitle for the moving image data, wherein the subtitle data comprises a style set element comprising at least one style element and at least one user changeable style element, the at least one style element comprising an identifier of the style element and style information to be applied to a text in a script element, and the at least one user changeable style element comprising an identifier of the user changeable style element and style information which can be changed by a user's selection; and a script element comprising text information having the text to be used for the subtitle, information on an output time when the subtitle is to be output, and information designating the identifier of the style element to be applied to the text, the method comprising:

reading an identifier of a user changeable style element from a register in an apparatus; and selecting a style to be applied to the text using the identifier of the style element and the identifier of the user changeable style element read from the register.

* * * * *